Jan. 16, 1934.  H. S. MARTIN ET AL  1,943,684
METHOD AND APPARATUS FOR CONTROLLING THE
HYDROGEN-ION CONCENTRATION OF SOLUTIONS
Filed June 7, 1930  3 Sheets-Sheet 1

INVENTORS,
Harold S. Martin,
Thomas A. Janney,
BY
ATTORNEYS

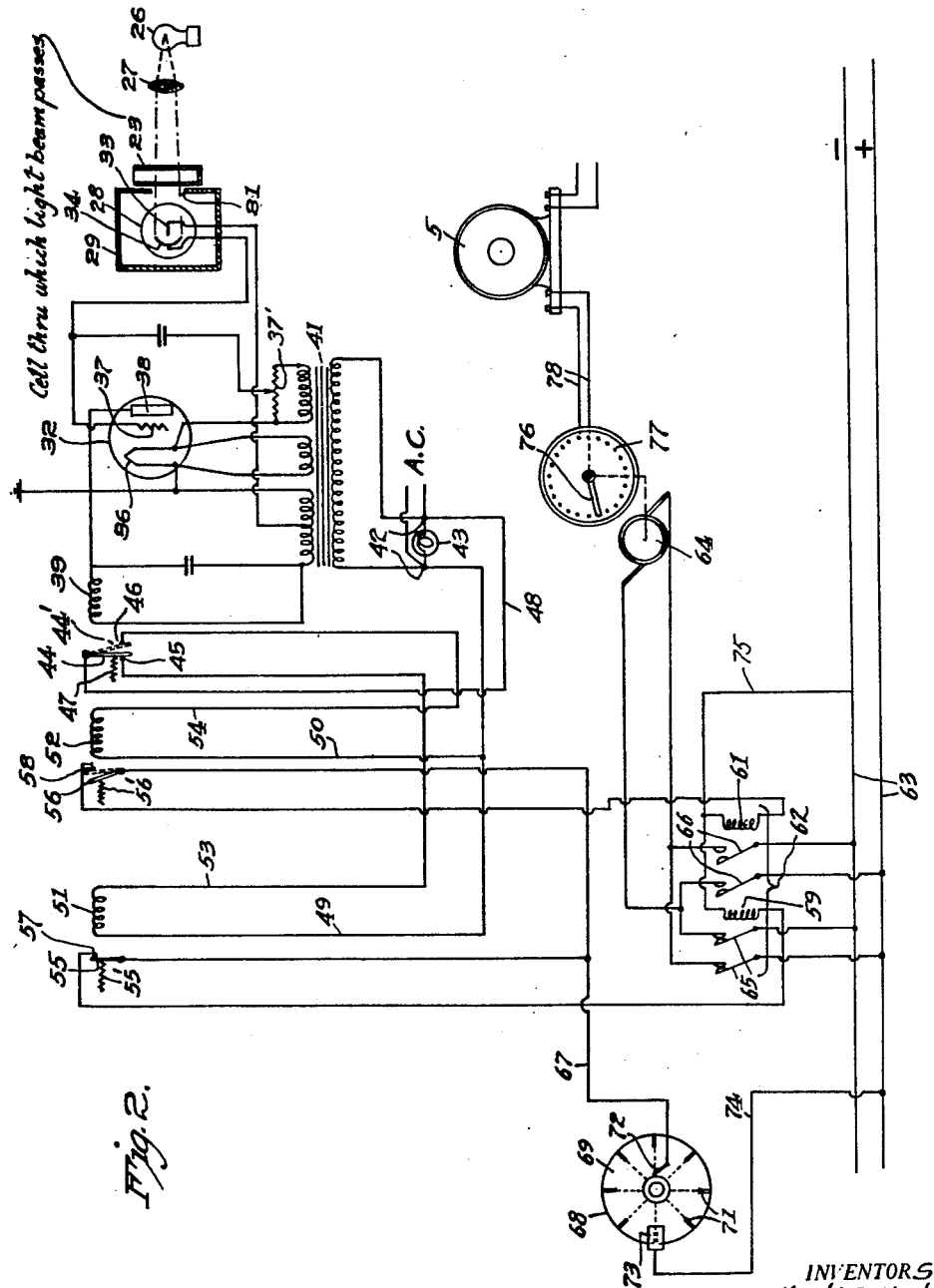

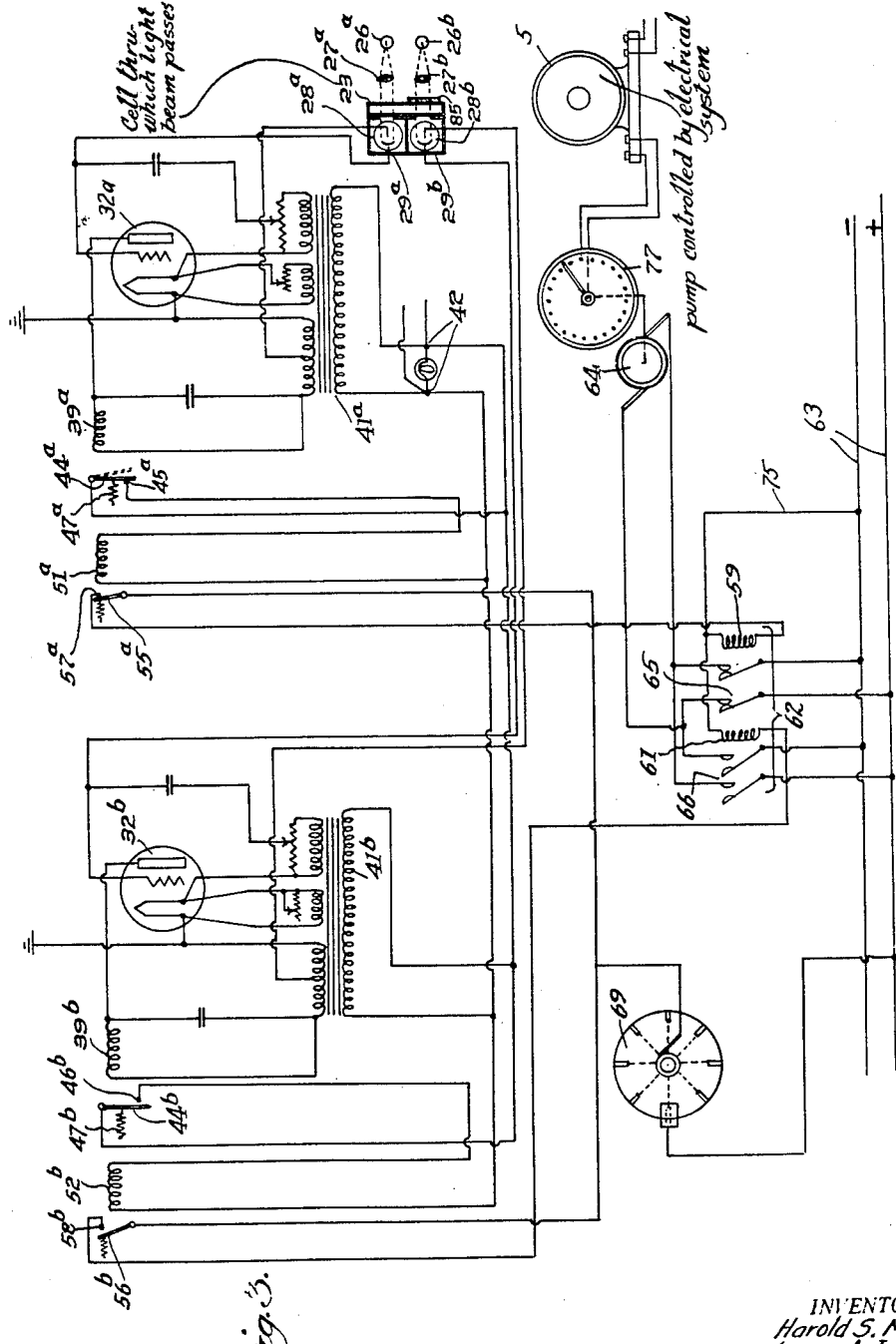

Patented Jan. 16, 1934

1,943,684

UNITED STATES PATENT OFFICE

1,943,684

METHOD AND APPARATUS FOR CONTROLLING THE HYDROGEN-ION CONCENTRATION OF SOLUTIONS

Harold S. Martin and Thomas A. Janney, Garfield, Utah

Application June 7, 1930. Serial No. 459,817

10 Claims. (Cl. 23—230)

This invention relates to a novel and advantageous method and apparatus for controlling the hydrogen-ion concentration or pH value of solutions, and particularly for accurately maintaining a certain hydrogen-ion concentration or pH, or a hydrogen-ion concentration within certain maximum and minimum limits, in a flowing solution whose hydrogen-ion concentration is continuously regulated by introduction of a pH controlling agent, such as a solution of known hydrogen-ion concentration (either an acid or an alkali) or a solid acid or alkali agent. It has heretofore been customary in such operations to take samples of such solutions at suitable intervals, and after adding suitable dyes or indicators, to match by eye the color so produced with color standards of known hydrogen-ion concentration, and then adjust the rate of supply of the acid or alkali in accordance with the determinations thus made.

The principal object of our invention is to provide for continuous automatic control of the hydrogen-ion concentration of such a solution, and particularly to provide such control by automatically increasing or decreasing the rate of supply of the acid or alkali in accordance with variations in the hydrogen-ion concentration of the solution after the addition of the acid or alkali thereto.

A particular object of the invention is to provide for such automatic control by the use of photo-electric cells and relays, the operation of said photo-electric cells being controlled in response to the intensity of color produced in the solution upon addition of suitable dyes or indicators thereto.

The method of our invention comprises essentially continuously removing a sample portion of the liquid whose hydrogen-ion concentration is to be controlled, continuously mixing a certain proportionate amount of indicating agent with such sample portion (after filtration, if necessary, to eliminate turbidity), interposing such sample portion between a source of light and a photo-electric cell so as to control the current through said photo-electric cell in accordance with variations in intensity of color of the sample, and automatically controlling the rate of addition to the solution of a pH controlling agent (either an acid or an alkali), at a position in advance of the point of removal of said sample portion, in accordance with variation in the current passing through said photo-electric cell. If desired, two photo-electric cells may be used, one of which is adapted to suitably adjust the rate of supply of the acid or alkali when the hydrogen-ion concentration reaches a maximum value while the other is adapted to suitably adjust such rate of supply when the hydrogen-ion concentration reaches a certain minimum value, thus cooperating to maintain the hydrogen-ion concentration of the solution at all times between these two values as limits. It is also within the scope of our invention to use any desired number of photo-electric cells or relays. For example, four photo-electric cells and corresponding relays may be used, two of which are adapted to produce rapid and relatively large changes in rate of supply while the other two may be utilized to effect smaller and more gradual changes, so as to permit extremely accurate control under normal conditions and at the same time enable the system to more rapidly counteract sudden fluctuations in hydrogen-ion concentrations of the solutions. In some cases only one photo-electric cell may be used, said cell and the mechanism controlled thereby being responsive to substantially the exact light intensity corresponding to the particular hydrogen-ion concentration desired, so that if the light intensity either materially exceeds or falls below this point the system will operate to either increase or decrease the rate of supply of the acid or alkali, as may be required.

The apparatus of our invention may comprise one or more photo-electric cells, one or more sources of light adapted to direct light upon the respective photo-electric cells, means for continuously removing a sample portion of the liquid whose hydrogen-ion concentration is to be controlled, means for filtering such solution if necessary, means for continuously mixing with said sample portion a proportionate amount of an indicating agent or of a combination of indicating agents adapted to produce in said sample an intensity of color dependent upon the hydrogen-ion concentration thereof and throughout the range of probable hydrogen-ion concentrations to be encountered, means for passing the sample after addition of the indicator through the path of the light directed upon the photo-electric cell or cells, and means operable in accordance with variations in current flow through said photo-electric cell or cells to control the rate of addition of a pH controlling agent to the liquid under control in advance of the point of removal of said sample portion thereof.

Said last named means may comprise a variable speed motor driving a pump or other suitable type of feeder which feeds the acid or alkali agent to the solution, relay means controlled by the photo-electric cell or cells, and means controlled by operation of said relay means to regulate the speed of said motor. In order to provide sufficient current for operation of the relay means it will generally be necessary in practice to connect the output of the photo-electric cell or cells to said relay means through suitable electrical amplifying means, consisting preferably of a thermionic vacuum tube or tubes.

The accompanying drawings illustrate embodiments of our invention and referring thereto:

Fig. 2 is a diagrammatic representation of one form of apparatus and electrical circuits for controlling the rate of supply of the pH controlling agent to the solution in accordance with variations in intensity of light received by a single photo-electric cell.

Fig. 3 is a similar representation of a form of apparatus embodying two photo-electric cells.

Figure 1:
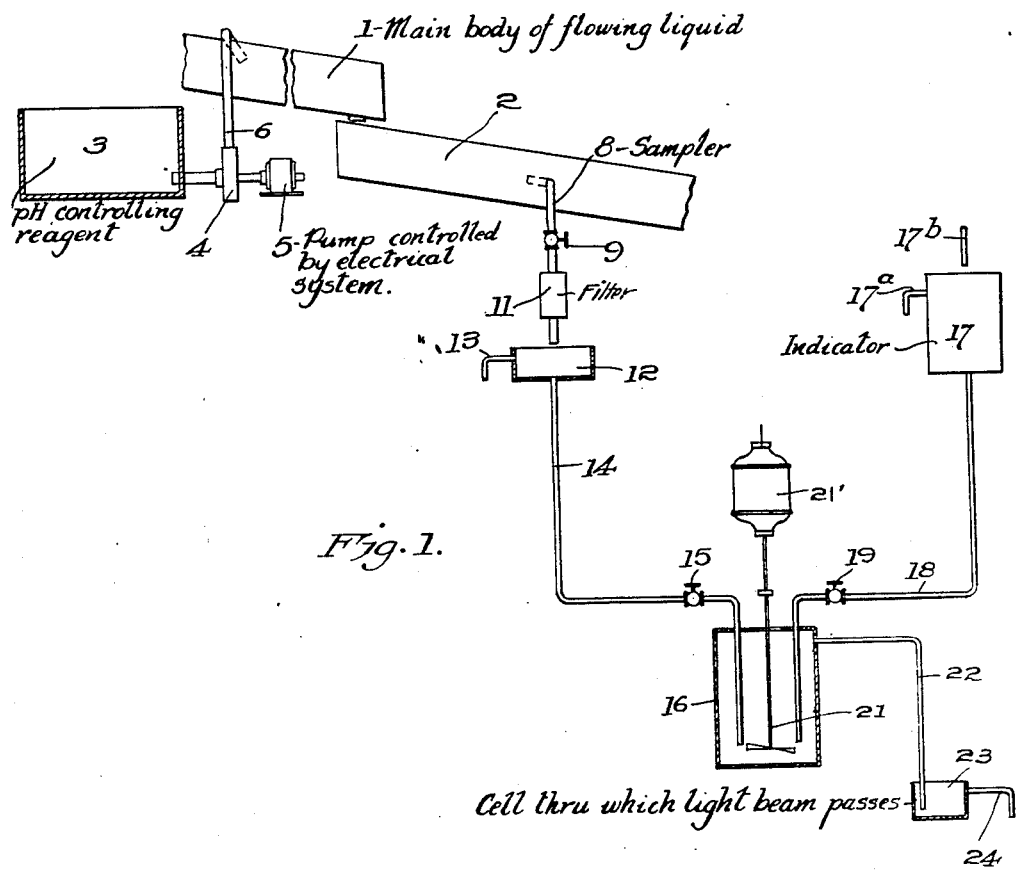
Fig. 1 is a semi-diagrammatic elevation showing the means for supplying to the solution the agent for controlling the hydrogen-ion concentration thereof and also the means for withdrawing a sample of said solution, for mixing the indicating agent therewith and for passing the resulting colored solution in position to influence the intensity of light.

Referring to Fig. 1, we have shown troughs 1 and 2, constituting liquid conducting means through which the solution whose hydrogen-ion concentration is to be controlled is caused to pass, such solution passing first through the trough 1 and being delivered thereby into the upper end of trough 2. It will be understood that the showing of troughs for this purpose is by way of example only and that the invention may be applied in connection with any suitable means for conducting or receiving the solution. The pH controlling agent introduced to the solution for the purpose of controlling the hydrogen-ion concentration thereof may be contained in a tank or other suitable receptacle 3 and may be delivered to the solution by means of any suitable feeder, such as a feed pump 4 driven by a variable speed electric motor 5. The pipe 6 leading from said pump is shown as delivering the agent into the upper trough 1, so that the agent delivered thereby will have sufficient opportunity to become thoroughly mixed and distributed throughout the solution in passing through the two troughs and particularly in being delivered from one trough to the other. Any other means, however, may be provided for causing thorough distribution of the pH controlling agent in the solution preceding the withdrawal of the sample used for control purposes.

At a suitable position in the lower trough 2 is provided a sampling pipe 8 for continuously withdrawing a certain portion of the solution, said pipe being preferably provided with a valve 9 for regulating or shutting off the flow therethrough. If desired, a filter 11 of any suitable type may also be connected in the pipe 8 in case the solution contains suspended matter which it is desirable to remove in order to form a clear solution. Sampling pipe 8 discharges into a constant level overflow receptacle 12 having an overflow pipe 13, and also an outlet pipe 14 connected below the overflow pipe so that the solution will pass at constant head through pipe 14 into a mixing vessel 16. Said pipe 14 may also be provided with a regulating valve 15 if desired. An indicating agent may also be delivered to mixing vessel 16 in any suitable manner and at a certain definite rate in proportion to the rate of introduction of the solution. For example, said indicating agent may be delivered from receptacle 17 through a pipe 18 provided with a regulating valve 19. In order to maintain a constant rate of supply of indicating agent, the receptacle 17 may also be provided with an overflow pipe 17a, and may be continually supplied with indicating agent through pipe 17b. Suitable means are preferably provided for agitating and thoroughly mixing the solution and indicating agent in the vessel 16, such means comprising, for example, a rotary stirring device 21 driven by a small electric motor 21' or the like. From said mixing vessel a pipe 22 leads to a vessel or cell 23 formed of plate glass or having transparent walls adapted to permit transmission of the beam of light through the solution contained therein. From said vessel, the solution may pass through pipe 24 whence it may be either returned to the main body of solution from which it was removed or disposed of in any suitable manner.

Referring now to Fig. 2, in which the light transmitting vessel is again indicated at 23, an electric lamp or other source of light is shown at 26 and a lens at 27 for directing a beam of light therefrom through the solution contained in said vessel. The walls of vessel 23 through which the light beam passes are preferably formed of plate glass of uniform thickness and light transmitting properties. A photo-electric cell 28 is mounted in position to receive the light so transmitted, and said cell may advantageously be mounted within a box 29 adapted to receive light only through an opening 31 through which said beam of light is directed. A thermionic amplifying tube is indicated at 32. The photo-electric cell is provided with the usual anode 33 and cathode 34, while the amplifying tube 32 is provided with the usual filament 36, grid 37 and plate 38. The electrodes of the photo-electric cell are connected in the grid or input circuit of the amplifying tube, while a relay winding 39 is connected in the plate or output circuit thereof. The necessary electric power for the photo-electric cell and for the filament, grid and plate circuits of the amplifying tube is shown as obtained in well known manner by means of an iron core transformer 41, whose primary winding is connected to alternating current supply terminals 42 and whose several secondary windings are connected to the circuits above named, as shown. A suitable voltage regulating device such as a glow tube 43 may be connected between the supply terminals 42 if desired, in order to maintain a constant voltage on the photo-electric cell and on the amplifying tube and thus insure that the current delivered from the amplifying tube and passing through the relay winding 39 will vary only with the intensity of light received by the photo-electric cell. The sensitivity of the amplifying tube may be controlled by adjusting the bias of the grid 37 thereof by means of potentiometer 37'.

The relay contact key 44 is adapted to make contact with either one of two contact members 45 and 46. When the current in relay winding 39 is below a certain value said key is held, as by means of spring 47, in engagement with contact member 45, but when said current exceeds a certain value said key is moved into engagement with contact member 46 as shown in dotted lines at 44'. The contact key 44 is shown as connected by wire 48 to one of the supply terminals 42, while the other supply terminal is connected by wires 49 and 50 to the relay windings 51 and 52 respectively, which are in turn connected by wires 53 and 54 to the respective contact members 45 and 46.

The contact keys 55 and 56, controlled by the relay windings 51 and 52 respectively, are biased toward open position, as by means of springs 55' and 56', but are adapted to make connection with contact members 57 and 58 respectively upon energization of the corresponding windings. The contact members 57 and 58 are connected to the respective windings 59 and 61 of a reversing switch indicated at 62, which is connected between direct current power supply wires 63 and a direct current motor 64, so that upon energization of winding 59 the contact members 65 are closed, causing said motor to be driven in one direction, and upon energization of the other winding 61 the contact members 66 are closed, causing said motor to be driven in the reverse direction. The circuits of the relay windings 59 and 61 are completed, from the contact keys 55 and 56 respectively, through the common return lead 67, which is connected to the other supply wire 63. However, in order to provide for only intermittent operation of motor 64, we may prefer in some cases to connect said return lead through a mechanical interrupting device indicated at 68. Said device is shown as comprising a rotating disc 69 of insulating material, driven at constant speed by any suitable means and provided with one or more contact segments 71 connected, as by means of brush 72, to the wire 67 and adapted to intermittently make and break contact with a fixed contact member 73 which is connected to one of the main supply wires 63 by means of wire 74. The windings 59 and 61 of the reversing switch are connected by wire 75 to the other supply wire.

The reversible motor 64 is operatively connected through suitable speed reducing means to the contact arm 76 of rheostat 77. The resistance of said rheostat is connected by wires 78 to the field winding of the direct current motor 5, which is in turn operatively connected to drive the feed pump 4, or other feeder, as above described.

In the operation of the above described apparatus, a sample of the solution is continuously withdrawn through pipe 8 and clarified by filter 11 if necessary, and passes thence through the constant level device 12 and pipe 14 to the mixing receptacle 16. The indicating agent is also continuously supplied to said mixing receptacle, from the receptacle 17, and thoroughly mixed therewith by agitating means 21. Any suitable indicator or combination of indicators may be used, in order to obtain the desired variation in color intensity within the range of hydrogen-ion concentrations apt to be encountered in the solution. For ranges of pH from 1.2 to 9.6 the sulphonphthalein indicators are suitable. These indicators are listed and their respective color changes shown on pages 64 to 66 of the 1928 edition of Clark's "The Determination of Hydrogen-ions". However, any other indicator whose color changes are visible to the human eye can be used by adjusting the intensity of the light source and the sensitivity and characteristics of the photo-electric cell, as well as other factors of the apparatus such as the degree of amplification, etc. Phenolphthalein which is known as "monochromatic", i. e., changes from light pink to deep red in the range of pH from 8.5 to 10.0, has been found suitable for use in certain cases. The above indicators are mentioned by way of examples only and the invention is not to be understood as restricted to the use of any particular indicator or class of indicators. Furthermore, such indicators may be introduced in any desired concentration into the sample of solution.

The sample containing the indicating agent thoroughly mixed therewith and having a color intensity determined by the hydrogen-ion concentration thereof, then passes through pipe 22 to the light transmitting vessel 23. The light from the source 26 is directed by lens 27 through the solution in said vessel and upon the light sensitive element of the photo-electric cell 28. The intensity of light thus falling upon the photo-electric cell determines the strength of current supplied to the grid circuit of the amplifying tube 32 and consequently the strength of current in the output or plate circuit of said tube. If it is desired to increase the selective sensitivity of the photo-electric cell for light of one particular color, for use with certain indicators, a glass plate adapted to transmit light of that color only or in great preponderance may be inserted in the path of the beam of light. In Fig. 2, the contact key 44 is shown as held by spring 47 in engagement with contact 45, and said contact key will remain in this position as long as the current in relay winding 39 is below a certain value, that is, as long as the light permitted to pass through the solution in vessel 23 and fall upon the photo-electric cell remains below a certain value.

As a specific example, assume that the agent delivered to the solution by feed pump or other feeder 4, for the purpose of controlling the hydrogen-ion concentration thereof, is an alkaline agent, such as sodium hydroxide solution, and that it is desired to maintain a certain pH such as 9.5, in other words, to maintain a certain alkalinity in the solution. In this case phenolphthalein may be used as an indicator, since it changes from colorless to increasing intensities of red between pH=8.3 and pH=10.2. With this indicator a photo-electric cell having a cesium cathode may be used. As the color imparted to the solution by the indicator changes from colorless to red, due to increasing pH (increasing alkalinity), the current passed by the photo-electric cell will gradually decrease, and the parts may be so designed and adjusted that when the current is less than that caused by the light transmitted through the solution when the pH is 9.5 (or other desired value within the range of color change of the indicator used), the contact key 44 will remain in engagement with contact member 45. This corresponds to too high a value of pH and indicates that the solution is too alkaline, and the supply of the alkaline agent must, therefore, be decreased. The manner in which the system operates to bring about this necessary decrease is as follows:

Closure of contact key 44 with contact member 45 establishes a circuit through relay winding 51, from the supply terminals 42 and causes contact key 55 to be held in engagement with contact member 57, thus energizing the relay winding 59 and closing contact members 65 of the reversing switch 62. Electric motor 64 is, therefore, caused to rotate in such direction as to decrease the resistance of rheostat 77 which is connected in series with the field winding of the shunt motor 5. Such decrease in resistance causes a decrease in the speed of said motor and thus causes rate of supply of the alkaline agent to be decreased. According to the preferred embodiment of our invention, however, the adjustment of rheostat 77 is effected only intermittently, since relay winding 59 of the reversing switch will be energized and cause operation of motor 64 only during the time when one of the contact segments 71 of the current interrupting device 68 is in engagement with the fixed contact member 73. Each time this connection is established the motor will operate to adjust the rheostat as above described and when the connection is broken at the interrupting device, the rheostat will remain in this position until the circuit is again closed by the next contact segment 71. This operation will continue until the pH of the solution is decreased to or slightly below the desired value, due to the decreased rate of supply of the alkaline agent.

When the pH falls to or slightly below the desired value, such as 9.5 in the above example, the increased intensity of light reaching the photo-electric cell will cause the current therethrough to be so increased that the amplified current through relay winding 39 causes contact key 44 to be attracted against the action of spring 47 and engage contact member 44'. This will cause de-energizing of relay winding 51 and energization of relay winding 52 and will consequently cause opening of contact key 55 and of the contact members 65 of the reversing switch and closing of contact key 56 and the contact members 66 of the reversing switch. Motor 64 will, therefore, be caused to rotate in the reverse direction and increase the resistance of rheostat 77, each time the circuit is completed at the interrupting device 68, and thus cause successive increases in speed of the motor 5 and consequent increases in rate of supply of the alkaline agent, so as to again increase the pH.

It is evident, therefore, that the system above described will operate to maintain substantially the desired hydrogen-ion concentration and will respectively increase or decrease the rate of supply of the controlling agent when the hydrogen-ion concentration departs from this value due to insufficiency or excess in the supply of such agent. It will also be understood that the invention may be applied in connection with the control of either acid or alkaline controlling agents, and that the indicating agent used may be such that increasing pH causes either an increase or decrease in intensity of the effective light received by the photo-electric cell. In any particular case, it is only necessary to properly arrange and connect the relays and the circuits controlled thereby so that an increase or decrease in the current passed by the photo-electric cell causes either an increase or decrease in the speed of the feed motor 5, as the particular conditions may require. One disadvantage of the system above described, however, is that it tends to continually "hunt", that is to say, one or the other of the relay contact keys 55 or 56 is always closed so that the motor controlling rheostat 77 is always subject to intermittent adjustment in one direction or the other. In cases where very exact control of the hydrogen-ion concentration is required, this may be necessary, in order that no great departure from this concentration shall be permitted. In other cases, however, where it is only necessary to maintain the hydrogen-ion concentration within a certain range, we may prefer to use a system comprising two photo-electric cells, one of which is responsive to a decrease in pH below a certain minimum value, and the other of which is responsive to an increase in pH above a certain maximum value.

A system of this latter type is shown in Fig. 3. In this case the portions of the apparatus shown in Fig. 1 may be substantially the same as above described, but two photo-electric cells 28a and 28b are mounted in position to receive light transmitted through the solution in the light transmitting vessel 23. Said cells may be mounted in separate light proof casings 29a and 29b and may be connected in the grid circuits of the amplifying tubes 32a and 32b respectively. The necessary electric power for operation of said photo-electric cells and amplifying tubes is obtained as before from transformers 41a and 41b which are again connected to power supply terminals 42. The plate or output circuit of amplifying tube 32a includes relay winding 39a which controls a contact key 44a, said contact key being biased as by means of spring 47a toward position of engagement with contact member 45a, but being adapted to be moved out of such engagement when the current in relay winding 39a exceeds a certain value. The contact members 44a and 45a are connected in the circuit of a relay winding 51a adapted to move contact key 55a into engagement with contact member 57a. Said last named contact members are again connected in the circuit of winding 59 of the reversing switch 62. The plate or ouptut circuit of the amplifying tube 32b includes a relay winding 39b which controls contact key 44b. Said contact key is biased, as by means of spring 47b toward position of non-engagement with contact member 46b, but is adapted to be moved by relay winding 39b into engagement with said contact member when the current in said relay winding exceeds a certain value. Contact members 44b and 46b are connected in the circuit of relay 52b adapted to close connection between contact key 56b and contact member 58b. Said last named contact members are in turn connected in the circuit of the other winding 61 of the reversing switch. The circuits of the windings 59 and 61 preferably include a circuit interrupting device 69 which operates in the same manner as in the form of the invention first described. The reversing switch 62 includes as before, contact means 65 and 66 controlled by the respective windings 59 and 61 and adapted to cause rotation of motor 64 in one direction or the other upon closing of the respective switches. Motor 64 is as before operatively connected to rheostat 77 which is again connected in the field winding circuit of feed motor 5 whose speed controls the rate of supply of the pH controlling agent.

Any suitable means may be provided for directing light through the solution in vessel 23 upon the light sensitive electrodes of the respective photo-electric cells 28a and 28b and for causing said cells to operate their respective relays when the color of the solution in vessel 23 is at two different points in the region of color of the particular indicator or combination of indicators used in said solution, corresponding respectively to the two limits of the range of hydrogen-ion concentrations which are to be maintained. For example, the differential response of the two photo-electric cells and their relays may be obtained by directing light beams of different intensities upon the respective cells, by making said cells of different sensitivity, or by varying the degree of amplification of the two amplifying tubes 32a and 32b or the operating current requirements of the two relay windings 39a and 39b. In the particular apparatus shown in the drawings, separate electric lamps or other sources of light 26a and 26b, and separate lenses 27a and 27b are provided for directing beams of light through the solution in vessel 23 and upon the light sensitive cathodes of the respective photo-electric cells, and the desired difference in response of the two cells is provided by placing a light screen or plate 85, of suitably colored glass or the like, in the path of the beam of light directed upon the photo-electric cell 28b. Said plate is adapted to absorb part of the light of the color to which the photo-electric cells are intended to respond, so that as the color change of the solution occurs progressively in the direction toward this particular color the photo-electric cell 28a will receive more light and consequently pass a greater amount of current than the cell 28b, and the relay 39a will act to open contact key 44a somewhat before the relay winding 39b will operate to close contact key 44b.

This system will, therefore, operate to maintain the hydrogen-ion concentration of the solution between the two limits corresponding to the two colors or intensities of color of the solution at which the respective photo-electric cells cause operation of the relays controlled thereby. If the hydrogen-ion concentration of the solution departs from the desired range in such direction that the color of the solution, with the particular indicator used, permits insufficient effective light to reach the photo-electric cell 28a, the relay winding 39a will be insufficiently energized and contact key 44a will be held in engagement with contact member 45a, thus operating through relays 51a and 59 to cause operation of motor 64 in one direction and cause a certain change, for example a decrease, in the effective resistance of rheostat 77 and a consequent change, for example a decrease, in speed of the feed motor 5. When the change thus produced in the rate of supply of the pH controlling agent to the solution has restored the hydrogen-ion concentration to the desired range, the color of the solution will become such as to transmit to photo-electric cell 28a sufficient light to cause relay 39a to open the contact key 44a. At this time, however, the light received by the other photo-electric cell 28b will be insufficient to cause the necessary energization of its relay winding 39b, and as long as the hydrogen-ion concentration remains within the desired range, the two contact keys 44a and 44b will both remain open and no further adjustment of the speed of motor 5 will be effected. This form of the invention, therefore, permits a limited fluctuation in hydrogen-ion concentration without requiring constant readjustment of the motor speed, and may, therefore, be found preferable where such limited fluctuation is permissible.

If the hydrogen-ion concentration, however, passes out of the allowable range at the other limit, the photo-electric cell 28b will receive sufficient light to cause sufficient energization of relay 39b to close contact key 44b and will thus bring about adjustment of the speed of motor 5 in the reverse direction, until the hydrogen-ion concentration is again restored to the desired range.

It will be understood that either of the above described forms of the apparatus may be adjusted to maintain any desired pH, by standardizing against a standard solution of known pH.

We claim:

1. The method of controlling the hydrogen-ion concentration of flowing solutions which comprises continually introducing to the solution and mixing therewith a pH controlling agent, subsequently removing a portion of the solution and continuously mixing therewith an indicating agent adapted to impart to the solution a color dependent upon the hydrogen-ion concentration thereof, interposing such portion of the solution between a source of light and a photo-electric cell so as to control the current through said photo-electric cell in accordance with variations in color of said portion, and automatically controlling the rate of addition of said pH controlling agent to the solution in accordance with variations in the current passing through said photo-electric cell.

2. The method of controlling the hydrogen-ion concentration of flowing solutions which comprises continually introducing to the solution and mixing therewith a pH controlling agent; subsequently removing a portion of the solution and continuously mixing therewith an indicating agent adapted to impart to the solution a color dependent upon the hydrogen-ion concentration thereof, interposing such portion of the solution between a source of light and a photo-electric cell so as to control the current through said photo-electric cell in accordance with variations in the color of said portion, causing the rate of supply of said pH controlling agent to the solution to be increased when the current through said photo-electric cell deviates in one direction from the value corresponding to the desired hydrogen-ion concentration, and to be decreased when said current deviates in the other direction from said value.

3. The method of controlling the hydrogen-ion concentration of flowing solutions which comprises continually introducing to the solution and mixing therewith a pH controlling agent, subsequently removing a portion of said solution and continuously mixing therewith an indicating agent adapted to impart thereto a color dependent upon the hydrogen-ion concentration thereof, interposing such portion of the solution between a source of light and a photo-electric cell so as to control the current through said photo-electric cell in accordance with variations in color of said portion, causing the rate of supply of said pH controlling agent to the solution to be intermittently increased in successive steps when the current through said photo-electric cell deviates in one direction from the value corresponding to the desired hydrogen-ion concentration, and to be intermittently decreased in successive steps when said current deviates in the other direction from said value.

4. The method of controlling the hydrogen-ion concentration of flowing solutions containing suspended solid material which comprises continually introducing to such a solution and mixing therewith a pH controlling agent, subsequently removing a portion of the solution and filtering such portion to remove suspended solid material therefrom, continuously mixing with the filtered solution an indicating agent adapted to impart thereto a color dependent upon the hydrogen-ion concentration thereof, interposing such portion of the solution between a source of light and a photo-electric cell so as to control the current through said photo-electric cell in accordance with variations in color of said portion, and automatically controlling the rate of supply of said pH controlling agent to the solution in accordance with variations in the current passing through said photo-electric cell.

5. An apparatus for controlling the hydrogen-ion concentration of solutions, comprising means for conducting a solution, means supplying to the solution in said conducting means a pH controlling agent, means continuously removing from said conducting means a portion of the solution after mixture of said controlling agent therewith, means for continuously mixing an indicating agent with the portion of the solution so removed, a photo-electric cell, means directing a beam of light through said portion of the solution and upon said photo-electric cell, an electric circuit connected to said photo-electric cell, and means associated with said electric circuit and operable to control the speed of said controlling agent supplying means in accordance with variations in the current passing through said photo-electric cell.

6. An apparatus for controlling the hydrogen-ion concentration of solutions, comprising means for conducting a solution, means for supplying to the solution in said conducting means a pH controlling agent, means for removing from said conducting means a portion of the solution after mixture of said controlling agent therewith, means for filtering said portion of the solution, means for continuously mixing with said portion of the solution a proportionate amount of an indicating agent, a photo-electric cell, means directing a beam of light through said portion of the solution and upon said photo-electric cell, an electric circuit connected to said photo-electric cell, and means associated with said electric circuit and operable to control the speed of said controlling agent supplying means in accordance with variations in the current passing through said photo-electric cell.

7. An apparatus for controlling the hydrogen-ion concentration of solutions comprising means for conducting a solution, means for supplying to the solution in said conducting means a pH controlling agent, means for removing from said conducting means a portion of the solution after mixture of said controlling agent therewith, means for continuously mixing an indicating agent with said portion of the solution, a photo-electric cell, means directing a beam of light through said portion of the solution and upon said photo-electric cell, an electric circuit connected to said photo-electric cell and means associated with said electric circuit and operable to cause an increase in the speed of said controlling agent supplying means when the electric current passing through said photo-electric cell deviates in one direction from a certain value.

8. An apparatus for controlling the hydrogen-ion concentration of solutions, comprising means for conducting a solution, means for supplying to the solution in said conducting means a pH controlling agent, means for removing from said conducting means a portion of the solution after mixture of said controlling agent therewith, means for continuously mixing an indicating agent with said portion of the solution, a photo-electric cell, means directing a beam of light through said portion of the solution and upon said photo-electric cell, an electric circuit connected to said photo-electric cell, and means associated with said electric circuit and operable to cause a decrease in speed of said controlling agent supplying means when the electric current passing through said photo-electric cell deviates in one direction from a certain value.

9. The method of controlling the hydrogen-ion concentration of flowing solutions which comprises continually introducing to the solution and mixing therewith a pH controlling agent, subsequently continuously removing a portion of the solution and continuously and uniformly mixing therewith an indicating agent adapted to impart to the solution a color dependent upon the hydrogen-ion concentration thereof, passing such portion of the solution continuously between a source of light and a photo-electric cell so as to control the current through said photo-electric cell in accordance with variations in color of said portion, and automatically controlling the rate of addition of said pH controlling agent to the solution in accordance with variations in the current passing through said photo-electric cell.

10. An apparatus for controlling the hydrogen-ion concentration of solutions comprising, means for conducting a solution, means for supplying to the solution in said conducting means a pH controlling agent, means continuously removing from said conducting means a portion of the solution after mixture of said controlling agent therewith, means for continuously adding to and mixing an indicating agent with the portion of solution so removed, a photo-electric cell, means directing a beam of light through said portion of the solution and upon said photo-electric cell, means causing continuous passage of said solution portion between said last-named means and said cell, an electric circuit connected to said photo-electric cell, and means associated with said electric circuit and operable to control the speed of said pH controlling agent supplying means in accordance with variations in the current passing through said photo-electric cell.

HAROLD S. MARTIN.
THOMAS A. JANNEY.